(12) United States Patent
Kim et al.

(10) Patent No.: US 11,631,532 B2
(45) Date of Patent: Apr. 18, 2023

(54) LARGE AREA TYPE COMPLEX MAGNETIC FIELD SHIELDING SHEET AND WIRELESS POWER TRANSFER MODULE INCLUDING THE SAME

(71) Applicant: AMOSENSE CO.,LTD., Cheonan-si (KR)

(72) Inventors: Chol Han Kim, Incheon (KR); Kil Jae Jang, Seongnam-si (KR)

(73) Assignee: Amosense Co., Ltd., Cheonan-si (KR)

( * ) Notice: Subject to any disclaimer, the term of this patent is extended or adjusted under 35 U.S.C. 154(b) by 340 days.

(21) Appl. No.: 16/956,681

(22) PCT Filed: Mar. 12, 2019

(86) PCT No.: PCT/KR2019/002849
§ 371 (c)(1),
(2) Date: Jun. 22, 2020

(87) PCT Pub. No.: WO2019/177341
PCT Pub. Date: Sep. 19, 2019

(65) Prior Publication Data
US 2020/0328024 A1 Oct. 15, 2020

(30) Foreign Application Priority Data
Mar. 13, 2018 (KR) .................. 10-2018-0029197

(51) Int. Cl.
*H01F 27/36* (2006.01)
*H02J 50/70* (2016.01)
(Continued)

(52) U.S. Cl.
CPC .......... *H01F 27/366* (2020.08); *H01F 38/14* (2013.01); *H02J 50/70* (2016.02); *H01F 27/22* (2013.01); *Y10T 428/32* (2015.01)

(58) Field of Classification Search
None
See application file for complete search history.

(56) References Cited

U.S. PATENT DOCUMENTS 7,981,528 B2 * 7/2011 Nakatani .......... G06K 19/07749
428/692.1
9,853,487 B2 * 12/2017 Song ...................... H02J 7/025
(Continued)

FOREIGN PATENT DOCUMENTS

CH       104011814 A     8/2014
JP      2008296431 A    12/2008
(Continued)

OTHER PUBLICATIONS

Extended European Search Report for application No. 19767346.0, dated Aug. 2, 2021, 9 pages.
(Continued)

*Primary Examiner* — Kevin M Bernatz
(74) *Attorney, Agent, or Firm* — Rothwell, Figg, Ernst & Manbeck, P.C.

(57) ABSTRACT

Provided are a large area type complex magnetic field shielding sheet and a wireless power transfer module including the same. A large area type complex magnetic field shielding sheet wherein at least one of an overall width, an overall length, and a diameter is 100 mm or more may include a main shielding layer arranged so that a plurality of ferrite block bodies each having a predetermined area are adjacent to each other, and an auxiliary shielding layer formed of at least one magnetic sheet having a predetermined area and laminated on the main shielding layer through an adhesive layer, wherein a boundary region between two ferrite block bodies disposed to be adjacent each other is disposed to be located in an inner region of the magnetic sheet and thus a magnetic field which leaks into a
(Continued)

gap between the two ferrite block bodies is blocked by the magnetic sheet.

17 Claims, 8 Drawing Sheets

(51) Int. Cl.
*H01F 38/14* (2006.01)
*H01F 27/22* (2006.01)

(56) References Cited

U.S. PATENT DOCUMENTS

| | | | | |
|---|---|---|---|---|
| 9,929,599 | B2* | 3/2018 | Jang | H01F 27/36 |
| 9,960,630 | B2* | 5/2018 | Jang | H02J 7/025 |
| 10,010,018 | B2 | 6/2018 | Lee et al. | |
| 10,028,420 | B2* | 7/2018 | Cho | H05K 9/0075 |
| 10,607,770 | B2 | 3/2020 | Noh et al. | |
| 11,005,175 | B2* | 5/2021 | Lim | H02J 50/10 |
| 11,087,912 | B2* | 8/2021 | Jang | H05K 9/0007 |
| 2005/0045358 | A1* | 3/2005 | Arnold | H05K 9/003 |
| | | | | 174/51 |
| 2014/0176380 | A1* | 6/2014 | Choi | H01Q 1/38 |
| | | | | 156/60 |
| 2014/0320369 | A1* | 10/2014 | Azenui | H01Q 21/28 |
| | | | | 343/841 |
| 2015/0102892 | A1* | 4/2015 | Yeo | H02J 50/70 |
| | | | | 336/200 |
| 2015/0109179 | A1* | 4/2015 | Ryu | H01F 41/02 |
| | | | | 343/788 |
| 2016/0057900 | A1* | 2/2016 | Polak | H01F 27/366 |
| | | | | 156/60 |
| 2016/0064814 | A1* | 3/2016 | Jang | H05K 9/0075 |
| | | | | 174/377 |
| 2017/0104358 | A1* | 4/2017 | Song | H01F 38/14 |
| 2017/0372837 | A1* | 12/2017 | Lee | H02J 50/005 |
| 2018/0198305 | A1* | 7/2018 | Hwang | H05K 9/0075 |
| 2018/0279517 | A1* | 9/2018 | Jang | H02J 50/12 |
| 2018/0315534 | A1* | 11/2018 | Jang | H05K 9/0007 |
| 2018/0352688 | A1* | 12/2018 | Jang | H01F 27/366 |
| 2019/0148988 | A1* | 5/2019 | Hwang | H01F 41/024 |
| | | | | 307/104 |

FOREIGN PATENT DOCUMENTS

| | | |
|---|---|---|
| KR | 1019990009810 A | 2/1999 |
| KR | 20160077462 A | 7/2016 |
| KR | 10-2016-0135678 A | 11/2016 |
| KR | 101690500 B1 | 12/2016 |
| KR | 20160140502 A | 12/2016 |
| KR | 20170027979 A | 3/2017 |
| KR | 20170050665 A | 5/2017 |
| KR | 1020170076566 A | 7/2017 |
| KR | 10-2017-0143167 A | 12/2017 |
| KR | 10-2019-0011112 A | 2/2019 |
| WO | 2017209481 A1 | 12/2017 |

OTHER PUBLICATIONS

International Search Report issued for International Application No. PCT/KR2019/002849 dated Jun. 24, 2019, 2 pages.

* cited by examiner

LARGE AREA TYPE COMPLEX MAGNETIC FIELD SHIELDING SHEET AND WIRELESS POWER TRANSFER MODULE INCLUDING THE SAME

CROSS REFERENCE TO RELATED APPLICATION

This application is the national phase entry of International Application No. PCT/KR2019/002849, filed on Mar. 12, 2019, designating the United States, which is based upon and claims priority to Korean Patent Application 10-2018-0029197, filed on Mar. 13, 2018, the entire contents of which are incorporated herein by reference.

TECHNICAL FIELD

The present invention relates to a wireless power transfer technology, and more specifically, to a large area type complex magnetic field shielding sheet and a wireless power transfer module including the same.

BACKGROUND

Exhaust gas emitted from automobiles using oil has emerged as a major cause of environmental pollution. Accordingly, efforts are being made to reduce the exhaust gas of the automobiles, and research and development of automobiles capable of reducing exhaust gas are underway.

In this situation, development of electric automobiles using alternative energy such as natural gas, ethanol, or the like and electric energy is emerging as a representative next-generation automobile technology. However, the electric automobiles currently under development have limitations in driving distance, weight, price, charging time, infrastructure, and the like.

That is, since a capacity of battery providing the driving power is limited, the electric automobile is difficult to drive for long distances. To this end, it is necessary to improve efficiency of the battery or increase the capacity of the battery.

However, improving the efficiency of the battery is almost impossible without development of an innovative technology due to limitation of materials which can be used as a battery, and in order to increase the capacity of the battery, there is a limitation that a weight or volume of the battery should be increased.

Accordingly, a wireless charging electric automobile system capable of overcoming limitation of an electric automobile which is currently being developed and ultimately charging the battery while driving has been developed.

A wireless charging method like the above includes a coil, which wirelessly transmits or receives power supplied from the outside, and a shielding sheet disposed on one surface of the coil to shield a magnetic field generated by the coil.

In this case, a magnetic sheet made of a ferrite material is usually used as the shielding sheet. However, the wireless power transmission module for vehicles used to charge an electric automobile requires a greater sized shielding sheet due to a greater power and transfer distance than the wireless power transmission module for a mobile device. Accordingly, the shielding sheet is also composed of a large area of 100 mm×100 mm or more.

Generally, a ferrite material is used as a shielding sheet used in wireless power transmission and receiving modules for vehicles. Since such a shielding sheet made of the ferrite material is formed through firing processing, warping or deformation occurs in a firing process when the shielding sheet is composed of a large area of 100 mm×100 mm or more, and thus there is a limitation in increasing the size.

Accordingly, the conventional shielding sheet for vehicles is generally configured in a shape in which ferrite block bodies each having a size of 100 mm×100 mm or less are disposed adjacent to each other. In this case, an interval between the ferrite block bodies is uniformly maintained after an interface is polished.

Accordingly, when a plurality of ferrite block bodies are disposed adjacent to each other, a gap should be generated between two ferrite block bodies disposed adjacent to each other.

Further, since a magnetic field is concentrated in a local area due to minute protrusions protruding between surfaces facing each other, there is a limitation in that a problem such as a hot spot occurs.

SUMMARY OF THE INVENTION

The present invention is directed to providing a large area type complex magnetic field shielding sheet capable of smoothly operating in a size having a large area of which at least one of an overall width, an overall length, and a diameter is 100 mm or more, and a wireless power transfer module including the same.

One aspect of the present invention provides a large area type complex magnetic field shielding sheet of which at least one of an overall width, an overall length, and a diameter is 100 mm or more, including a main shielding layer arranged so that a plurality of ferrite block bodies each having a predetermined area are adjacent to each other, and an auxiliary shielding layer formed of at least one magnetic sheet having a predetermined area and laminated on one surface of the main shielding layer through an adhesive layer, wherein a boundary region between two ferrite block bodies disposed to be adjacent each other is disposed to be located in an inner region of the magnetic sheet and thus a magnetic field which leaks into a gap between the two ferrite block bodies is blocked by the magnetic sheet.

Further, the magnetic sheet may be an amorphous ribbon sheet, the ferrite block body may be formed of a Mn—Zn ferrite, and the magnetic sheet may have a relatively smaller thickness than the ferrite block body.

In addition, the auxiliary shielding layer may be disposed on each of an upper surface and a lower surface of the main shielding layer, the auxiliary shielding layer and the main shielding layer may be alternately laminated in a lamination direction, and the main shielding layer may be disposed to be located between two auxiliary shielding layers.

In addition, at least a portion of the gap formed between the two ferrite block bodies disposed to be adjacent each other may be formed not to be parallel to a thickness direction of the auxiliary shielding layer.

In addition, the large area type complex magnetic field shielding sheet may further include a plate-shaped heat dissipation plate disposed on one surface of the auxiliary shielding layer to improve a heat dissipation property.

Meanwhile, the present invention provides a wireless power transfer module including the above-described large area type complex magnetic field shielding sheet, and at least one wireless power transfer antenna disposed on one surface of the large area type complex magnetic field shielding sheet.

According to the present invention, even when the shielding sheet includes a plurality of ferrite block bodies disposed adjacent to each other and is implemented in a size having a large area of which at least one of an overall width, an overall length, and a diameter is 100 mm or more, a problem that a magnetic field leaks through a gap between the ferrite block bodies can be improved. Accordingly, various problems such as reduced efficiency and heat generation due to magnetic field leakage can be improved.

DETAILED DESCRIPTION OF THE INVENTION

Figure 1:
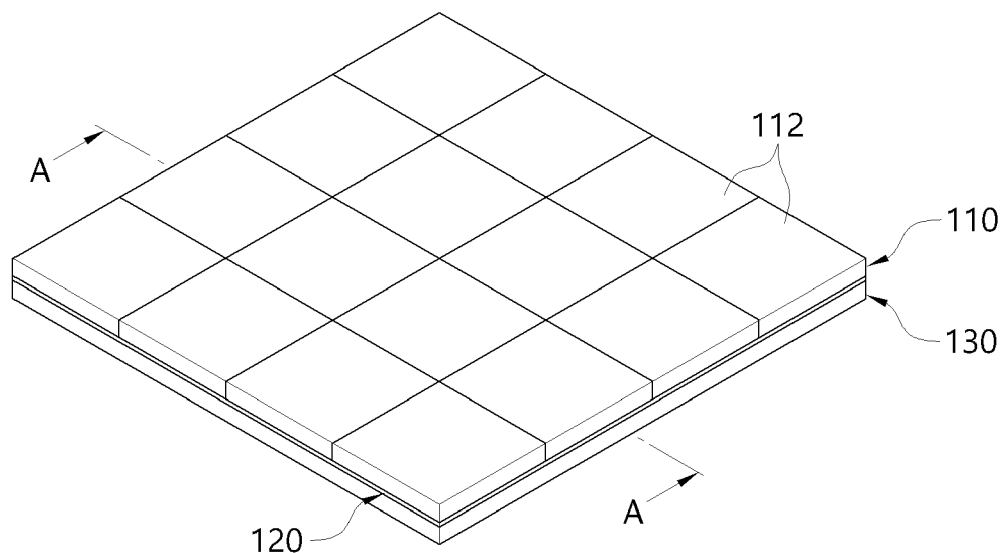
FIG. 1 is a view illustrating a large area type complex magnetic field shielding sheet according to one embodiment of the present invention.

Hereinafter, exemplary embodiments of the present invention will be described in detail with reference to the accompanying drawings which may allow one of ordinary skill in the art to easily carry out the present invention. The present invention may be implemented in various forms and is not limited to the following embodiments. Components not related to the description are not included in the drawings to clearly describe the present invention, and the same reference symbols are used for the same or similar components in the description.

A large area type complex magnetic field shielding sheet 100 according to one embodiment of the present invention may be implemented as a large area of which at least one of an overall width, an overall length, and a diameter is 100 mm or more. As an example, the large area type complex magnetic field shielding sheet 100 may have an overall width and overall length of 100 mm or more, and may be implemented as a size of 400 mm×400 mm.

However, the size of the large area type complex magnetic field shielding sheet 100 is not limited thereto and may be variously changed according to design conditions when the size is 100 mm×100 mm or more or the diameter is 100 mm or more.

In this case, the large area type complex magnetic field shielding sheet 100 according to one embodiment of the present invention may include at least two shielding layers to minimize an increase in production costs and realize an excellent shielding performance even when implemented in the size of 100 mm×100 mm or more, and the two shielding layers may be laminated on each other.

Figure 2:
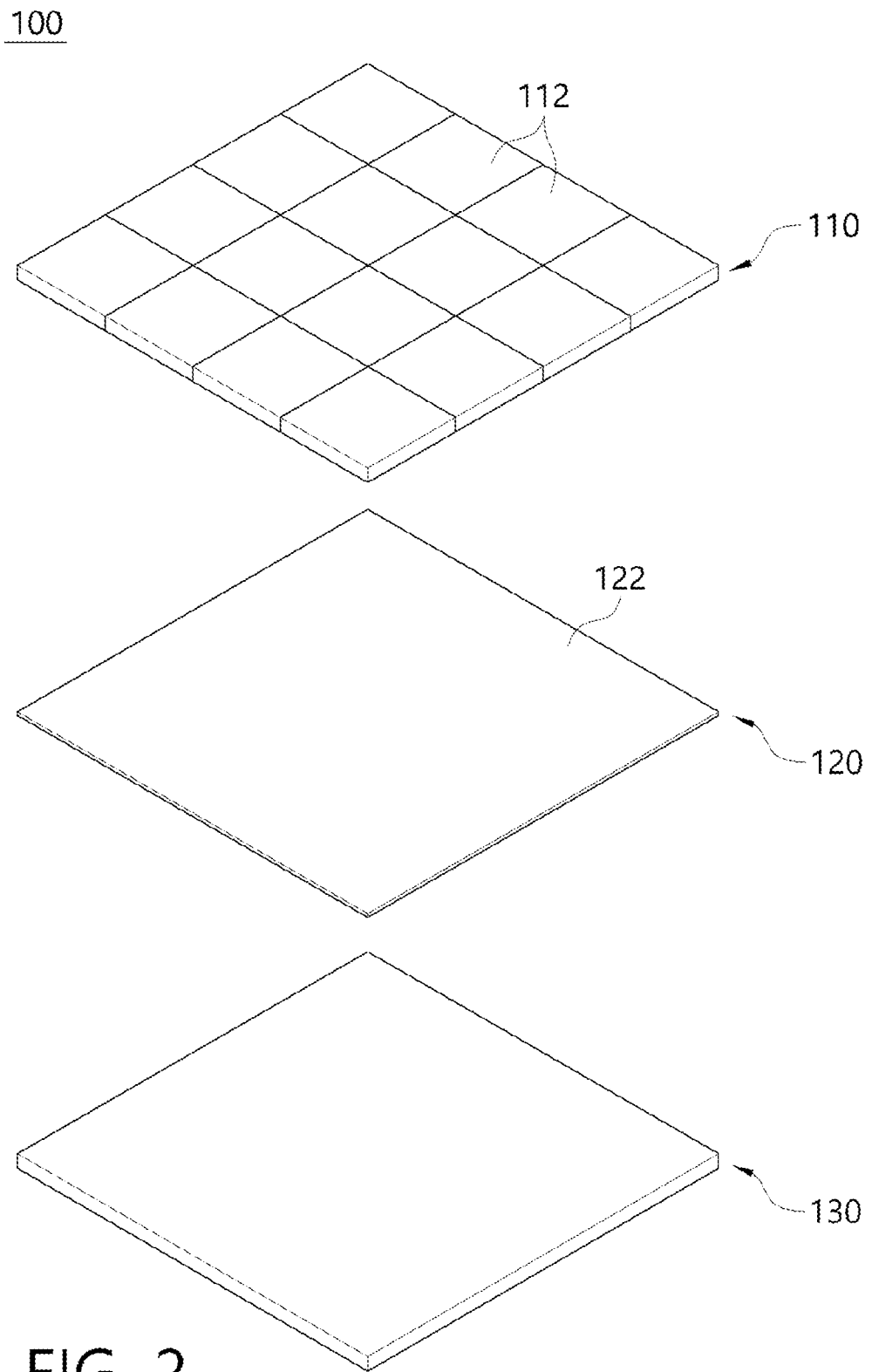
FIG. 2 is an exploded view of FIG. 1.
Figure 3:
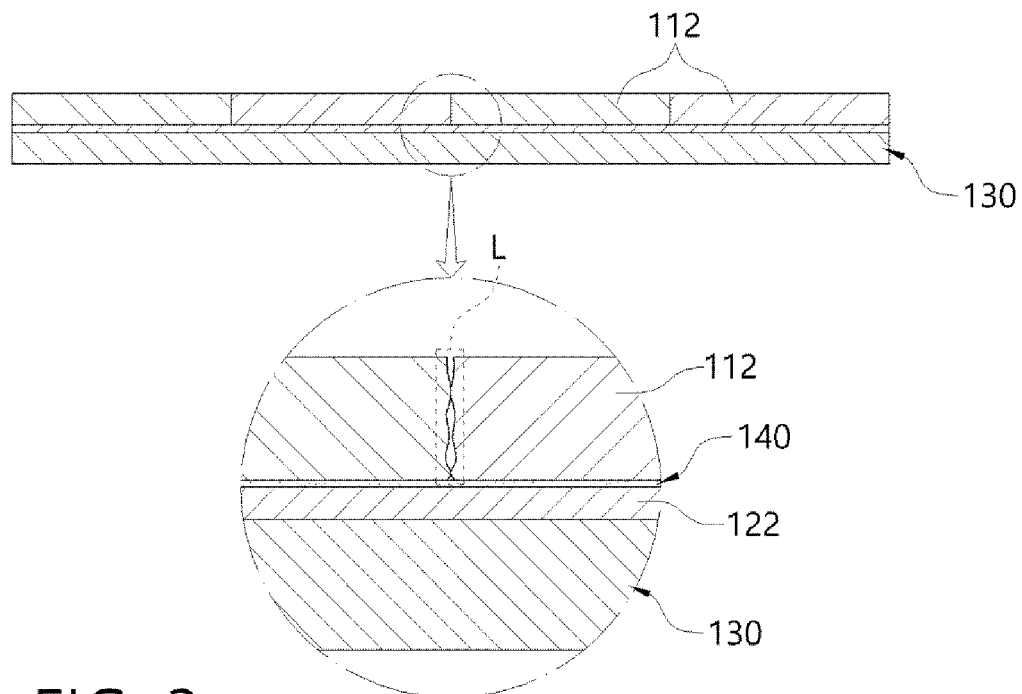
FIG. 3 is a cross-sectional view in direction A-A in FIG. 1.

That is, as shown in FIGS. 1 to 3, the large area type complex magnetic field shielding sheet 100 according to one embodiment of the present invention may include a main shielding layer 110 which shields a magnetic field and an auxiliary shielding layer 120 which complements the main shielding layer 110, and the main shielding layer 110 and the auxiliary shielding layer 120 may be laminated on each other.

Specifically, the main shielding layer 110 may be composed of a plurality of ferrite block bodies 112 each having a predetermined area, and the plurality of ferrite block bodies 112 may be disposed so that at least one sides thereof may become adjacent to each other.

In the present invention, the ferrite block bodies 112 may be sintered through a firing process after pressing ferrite powder. In this case, the ferrite block bodies 112 may be formed of Ni—Zn ferrite or Mn—Zn ferrite but may be formed of Mn—Zn ferrite to show a relatively superior performance in a frequency band of 100 to 350 kHz.

As described above, the ferrite block bodies 112 like the above may be disposed so that the one sides become adjacent to each other to constitute the main shielding layer 110 which is a major shielding layer which shields the magnetic field.

Here, the plurality of ferrite block bodies 112 which constitute the main shielding layer 110 may be arranged in an m×n matrix structure (here, m and n are natural numbers) and may have the same size or different size.

In this case, the large area type complex magnetic field shielding sheet 100 according to one embodiment of the present invention may include the auxiliary shielding layer 120 disposed on at least one surface of the main shielding layer 110, and a boundary region L between two ferrite block bodies 112 disposed adjacent to each other may be disposed to be located in an inner region of the auxiliary shielding layer 120.

To this end, the auxiliary shielding layer 120 may be a plate-shaped magnetic sheet 122 having a predetermined area and may be provided to have a size or area relatively greater than that of the ferrite block body 112.

Preferably, the magnetic sheet 122 may have an area the same as or greater than an area of the sum of the two ferrite block bodies 112 disposed adjacent to each other and may have an area the same as overall areas of the main shielding layers 110 and 210 or half of the overall area of the main shielding layer 110.

In this case, as shown in FIG. 3, the plurality of ferrite block bodies 112 which constitute the main shielding layer 110 may be attached to one surface of the auxiliary shielding layer 120 through an adhesive layer 140 disposed on one surface of the auxiliary shielding layer 120. Accordingly, the plurality of ferrite block bodies 112 which constitute the main shielding layer 110 may have fixed positions in one surface of the auxiliary shielding layer 120 through the adhesive layer 140.

Accordingly, in the large area type complex magnetic field shielding sheet 100 according to one embodiment of the present invention, even when the magnetic field leaks through a gap formed between two ferrite block bodies 112 disposed adjacent to each other in a process of shielding the magnetic field through the main shielding layer 110, the magnetic field which leaks through the gap may be blocked through the auxiliary shielding layer 120.

Accordingly, in the large area type complex magnetic field shielding sheet 100 according to one embodiment of the present invention, since the magnetic field which leaks through the gap between the ferrite block bodies 112 is blocked through the auxiliary shielding layer 120, the shielding performance may be improved by reducing a leaking amount of the magnetic field.

Further, even when the plurality of ferrite block bodies 112 which constitute the main shielding layer 110 are disposed adjacent to other ferrite block bodies 112 in a state of not having flat surfaces and including fine protrusions protruding from the surfaces, the magnetic field which leaks through the gap between two ferrite block bodies 112 disposed adjacent to each other may be guided to the auxiliary shielding layer 120, and thus concentration of the magnetic field toward the protrusions may be prevented.

Accordingly, in the large area type complex magnetic field shielding sheet 100 according to one embodiment of the present invention, since the magnetic field which leaks through the gap between ferrite block bodies 112 may be guided to the auxiliary shielding layer 120 and prevented from concentrating toward the protrusions, a heat generation problem due to the concentration of the magnetic field, such as a hot spot, may be prevented.

Meanwhile, as described above, the magnetic sheet 122 which constitutes the auxiliary shielding layer 120 may be a magnetic material capable of shielding a magnetic field which leaks from the main shielding layer 110. As an example, a material capable of shielding the magnetic field, such as a composite material in which a magnetic material is dispersed in a polymer, a ferrite, an amorphous ribbon sheet, or the like, may be used as the magnetic sheet 122 without a limitation.

In this case, the magnetic sheet 122 may have a thickness that is half or less of a thickness of the ferrite block body 112 which constitutes the main shielding layer 110. That is, the magnetic sheet 122 may be formed of a material having a very thin thickness and realizing high permeability.

However, in the present invention, the thickness of the magnetic sheet 122 is not limited thereto, and it is noted that the thickness of the magnetic sheet 122 is relatively thinner than the ferrite block body 112.

As a specific example, the magnetic sheet 122 may be a ribbon sheet including at least one or more of an amorphous alloy and a nanocrystalline alloy, and the ribbon sheet may be a sheet flaked to be formed separately into a plurality of fine pieces.

Further, the magnetic sheet 122 may be a multilayer sheet in which a plurality of ribbon sheets are laminated in multiple layers through an adhesive layer. In this case, protection films 122*c* may be attached to an upper surface and a lower surface of the magnetic sheet 122 through adhesive layers 122*b* to prevent separation of the fine pieces.

Figure 4:
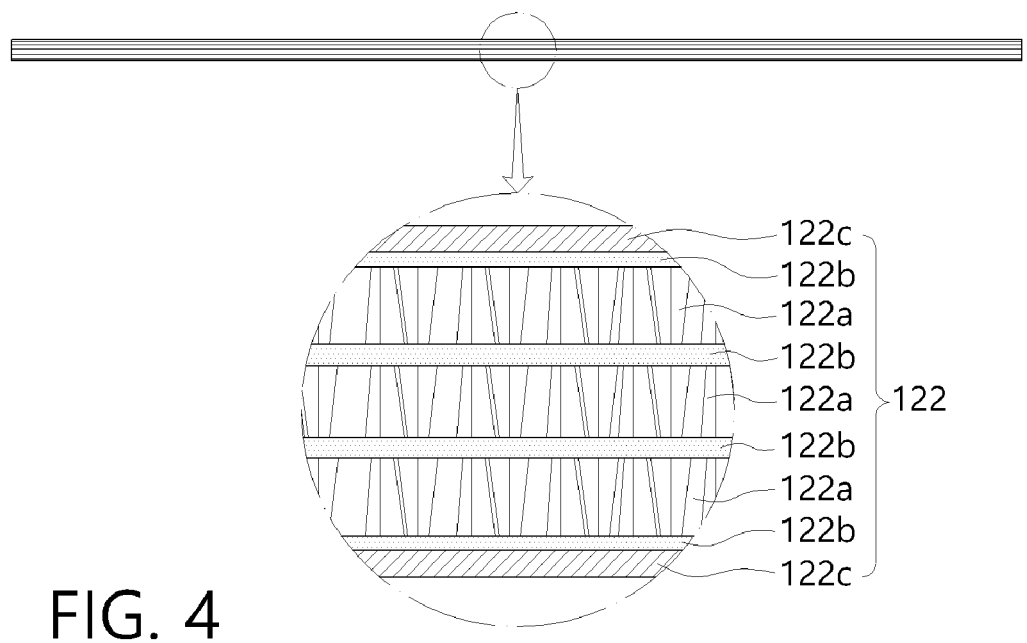
FIG. 4 is a view illustrating one shape of a magnetic sheet which constitutes an auxiliary shielding layer in the large area type complex magnetic field shielding sheet according to one embodiment of the present invention.

That is, as shown in FIG. 4, in the magnetic sheet 122, a ribbon sheet 122*a* may be flaked to be formed separately into a plurality of fine pieces, and each of the fine pieces may be formed to be irregular. Accordingly, the magnetic sheet 122 may restrain generation of eddy currents by increasing overall resistance to reduce loss due to the eddy currents.

Further, the magnetic sheet 122 may be a multilayer sheet in which the plurality of ribbon sheets 122*a* which are flaked to be separated into the plurality of fine pieces are laminated in multiple layers. In this case, the adhesive layers 122*b* including nonconductive ingredients may be disposed between the ribbon sheets 122*a*. The adhesive layers 122*b* may partially or entirely permeate toward the ribbon sheets 122*a* which are laminated on each other. Accordingly, the fine pieces which constitute the ribbon sheet 122*a* may be insulated. Here, the adhesive layer may be provided as an adhesive and may also include a film-shaped base material and an adhesive coated on one surface or both surfaces of the base material.

Accordingly, in the large area type complex magnetic field shielding sheet 100 according to one embodiment of the present invention, the auxiliary shielding layer 120 may be configured in a very thin thickness. Accordingly, in large area type complex magnetic field shielding sheet 100 according to one embodiment of the present invention, since use of the magnetic sheets 122 which constitute the auxiliary shielding layer 120 may be minimized, an excellent shielding performance may be realized and an increase in production costs may be minimized.

Meanwhile, as described above, the large area type complex magnetic field shielding sheet 100 according to one embodiment of the present invention may have a shape in which the auxiliary shielding layer 120 is laminated on only one surface of the main shielding layer 110, but as shown in FIGS. 5 to 8, the main shielding layer 110 and the auxiliary shielding layer 120 may be configured in various lamination methods.

Figure 5:
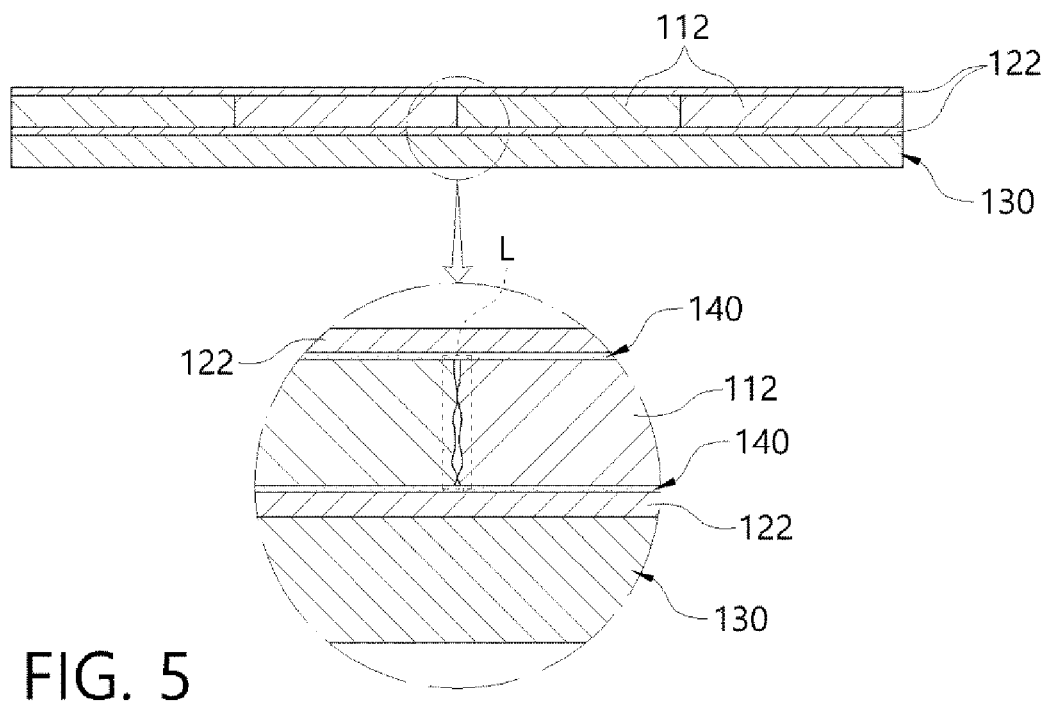
FIG. 5 is a cross-sectional view illustrating a shape in which the auxiliary shielding layer is disposed on an upper surface of a main shielding layer in FIG. 3.

That is, as shown in FIG. 5, in the large area type complex magnetic field shielding sheet 100 according to one embodiment of the present invention, the above-described auxiliary shielding layers 120 may be disposed on both an upper surface and a lower surface of the main shielding layer 110.

In this case, since a magnetic field transmitted from or received by a wireless power transfer antenna 10 is dispersed to the main shielding layer 110 and the auxiliary shielding layers 120, some of the overall magnetic field may be blocked through the auxiliary shielding layers 120.

Accordingly, an amount of the magnetic field which is necessary to be blocked at the main shielding layer 110 may be reduced, and a leaking amount of the magnetic field which is not blocked at the main shielding layer 110 but leaks through the gap between the two ferrite block bodies 112 disposed adjacent to each other may be reduced. Accordingly, in comparison with the above-described embodiment, since the leaking amount of the magnetic field may be further reduced, an overall shielding performance may be improved.

Figure 6:
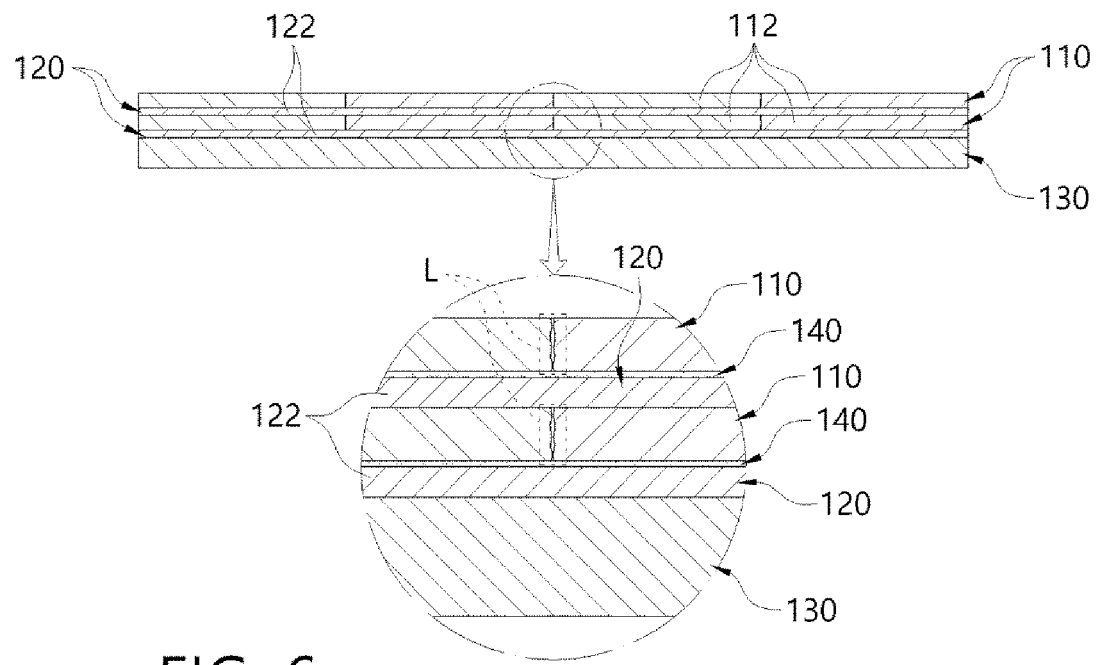
FIG. 6 is a cross-sectional view illustrating a shape in which another main shielding layer is disposed on an upper surface of the auxiliary shielding layer in FIG. 5.

As another example, as shown in FIG. 6, in the large area type complex magnetic field shielding sheet 100 according to one embodiment of the present invention, the main shielding layer 110 and the auxiliary shielding layer 120 may be provided in plural, and the auxiliary shielding layers 120 and the main shielding layers 110 may be sequentially laminated along a lamination direction.

Figure 7:
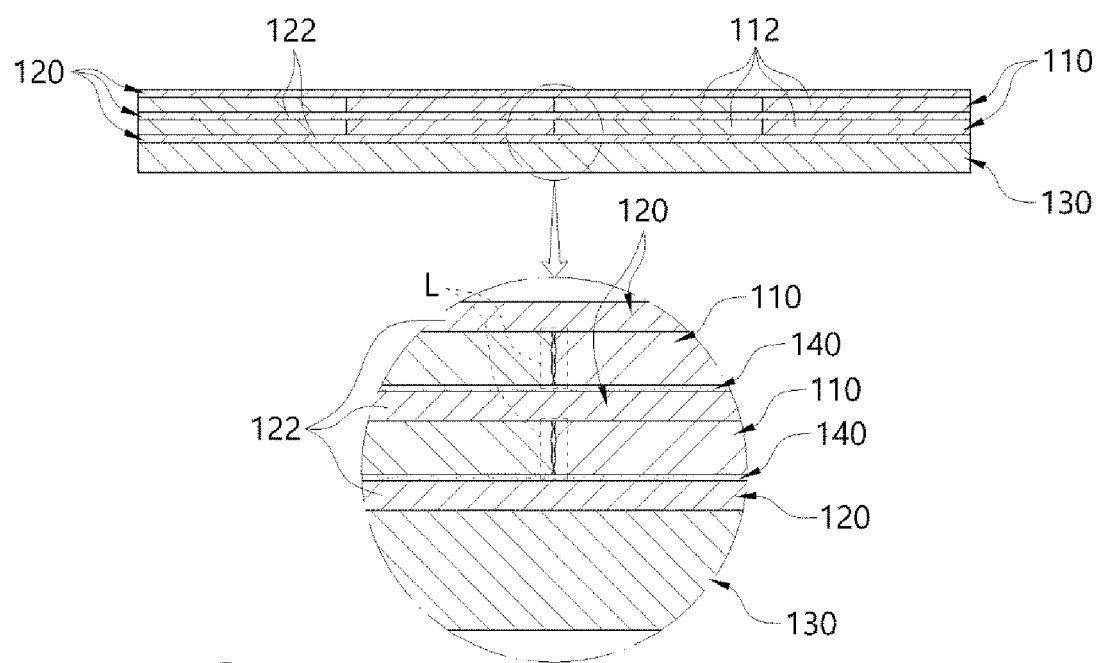
FIG. 7 is a cross-sectional view illustrating a shape in which an auxiliary shielding layer is disposed on an upper surface of another main shielding layer in FIG. 6.

Further, as shown in FIG. 7, the auxiliary shielding layer 120 may also be disposed on the upper surface of the uppermost main shielding layer 110 among the plurality of main shielding layers 110. That is, each of the plurality of main shielding layers 110 may be disposed to be located between the two auxiliary shielding layers 120.

In this case, the plurality of ferrite block bodies 112 which constitute the main shielding layer 110 may each have a smaller thickness than the ferrite block body 112 shown in FIGS. 3 and 5, and an overall thickness of the plurality of main shielding layers 110 may be the same as a thickness of the main shielding layer 110 shown in FIGS. 3 and 5.

Accordingly, in the embodiment shown in FIGS. 6 and 7, the thickness of the ferrite block body 112 which constitutes each of the main shielding layer 110 may be relatively smaller than the thickness of the ferrite block body 112 which constitutes the main shielding layer 110 shown in FIGS. 3 and 5.

Accordingly, since a size of the ferrite block body 112 which constitutes each of the main shielding layers 110 may be reduced, manufacturing defects such as warping, which may occur in a firing process, may be further reduced. Further, in the large area type complex magnetic field shielding sheet 100 of the embodiment shown in FIGS. 6 and 7, since the number of auxiliary shielding layers 120 may be increased while maintaining the same thickness in comparison with the embodiment shown in FIGS. 3 and 5, the overall shielding performance may be further improved.

Meanwhile, in a large area type complex magnetic field shielding sheet 200 according to one embodiment of the present invention, a leaking amount of a magnetic field may be reduced through a shape of each of ferrite block bodies 212 which constitutes the main shielding layer 210.

To this end, in the large area type complex magnetic field shielding sheet 200 according to one embodiment of the present invention, the plurality of ferrite block bodies 212 which constitute the main shielding layer 210 may have shapes excluding a rectangular parallelepiped shape, and two ferrite block bodies 212 disposed adjacent to each other may have portions engaged with each other.

Figure 8:
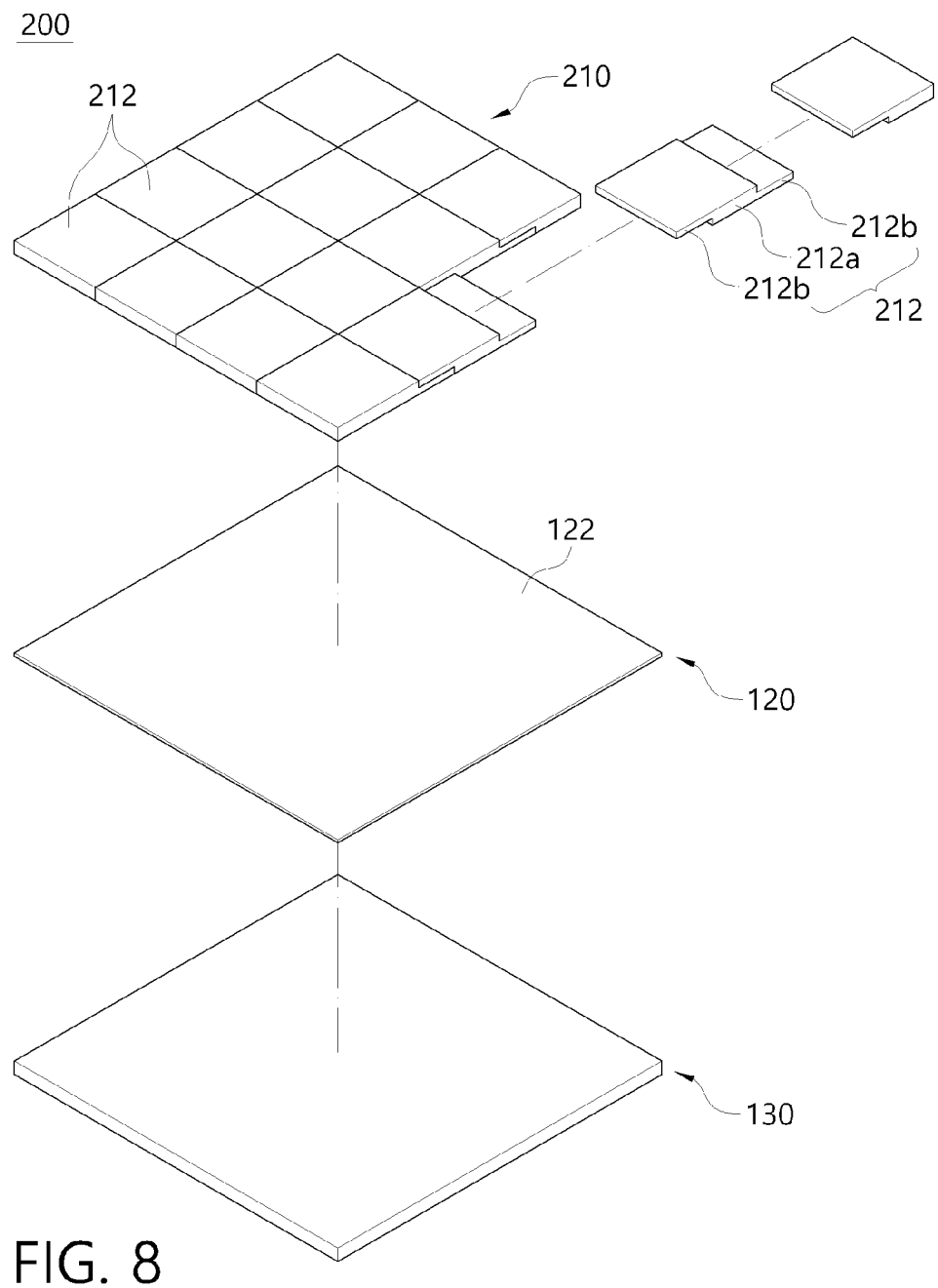
FIG. 8 is an exploded view illustrating a large area type complex magnetic field shielding sheet according to another embodiment of the present invention.
Figure 9:
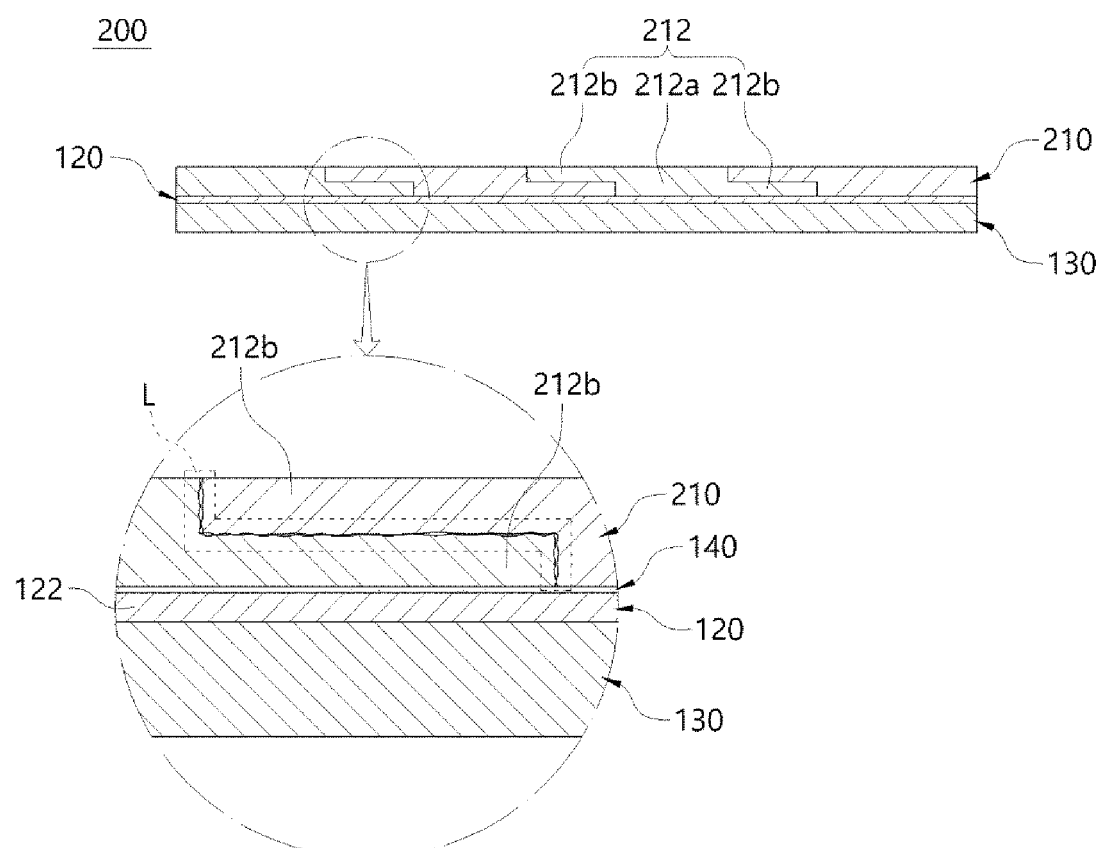
FIG. 9 is a coupling-sectional view of FIG. 8.
Figure 10:
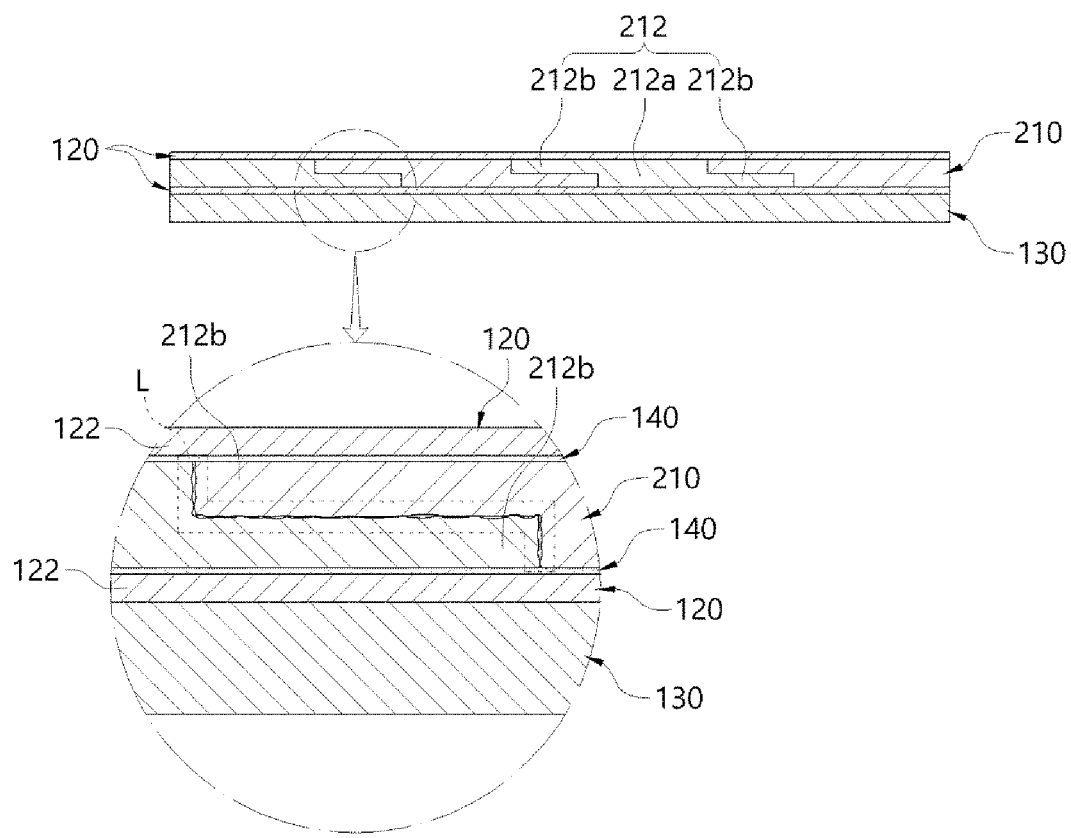
FIG. 10 is a cross-sectional view illustrating a shape in which an auxiliary shielding layer is disposed on an upper surface of a main shielding layer in FIG. 9.

As an example, as shown in FIGS. 8 to 10, the ferrite block body 212 may include a rectangular parallelepiped-shaped body 212a and at least one protruding portion 212b which extends from the body 212a.

In this case, the protruding portion 212b may extend in a direction not parallel to a thickness direction of the body 212a and may have positions and shapes engaged with other protruding portions 212b which extend from the bodies 212a of other ferrite block bodies 212 disposed adjacent to each other.

Specifically, the protruding portion 212b may extend in a direction parallel to a longitudinal direction or width direction from a side surface of the body 212a, and when the protruding portions 212b extend from both side surfaces of the body 212a, the two protruding portions 212b may extend in opposite directions.

Accordingly, as shown in FIGS. 9 and 10, at least a portion of a gap formed between the two ferrite block bodies 212 disposed adjacent to each other may be not parallel to the thickness direction of the auxiliary shielding layer.

Accordingly, even when a magnetic field leaks through the gap, a leakage path may be formed as a curved path other than a straight path and thus an overall shielding performance may be further improved by reducing a leaking amount of the magnetic field.

In this case, the auxiliary shielding layer 120 may be provided on only one surface of the main shielding layer 210 as shown in FIGS. 8 and 9 and may be provided on both surfaces of the main shielding layer 210.

However, the positions and shapes of the protruding portions 212b are not limited thereto, and the shapes of the protruding portions 212b may be appropriately changed when the gap formed between the two ferrite block bodies 212 disposed adjacent to each other through the protruding portions 212b may form a curved path. Further, forming positions of the protruding portions 212b may be appropriately changed when the two ferrite block bodies 212 disposed adjacent to each other may be connected through the protruding portions 212b.

Further, although not shown in the drawings, the method shown in FIGS. 6 and 7 may be applied to the large area type complex magnetic field shielding sheet 200 shown in FIGS. 8 to 10. In addition, in the case of the embodiment shown in FIGS. 8 to 10, since technical contents excluding the shape of the ferrite block body 212 are the same as the above-described embodiment, detailed descriptions will be omitted.

Meanwhile, each of the large area type complex magnetic field shielding sheets 100 and 200 according to one embodiment of the present invention may further include a plate-shaped heat dissipation plate 130 having a heat dissipation property.

The heat dissipation plate 130 may be disposed on one surface of the auxiliary shielding layer 120. Accordingly, the heat dissipation plate 130 may support the auxiliary shielding layer 120, and may disperse the heat transferred through the auxiliary shielding layer 120 and emit to the outside. Accordingly, the heat dissipation plate 130 may improve performance degradation due to the heat by emitting heat which may be generated when the magnetic field is shielded to the outside to improve a thermal problem.

To this end, the heat dissipation plate 130 may be formed of a material having excellent heat conductivity.

As an example, the heat dissipation plate 130 may be a plate-shaped metal plate such as copper or aluminum, may be a plate-shaped member including graphite, and may be formed of a plastic material having a heat dissipation property. Further, the heat dissipation plate 130 is not limited to the above, and any material having a heat conductivity of 200 W/m·K or more may be used without a limitation. In addition, a heat dissipation coating layer (not shown) may be formed on an outer surface of the heat dissipation plate 130 to improve a heat dissipation property.

Meanwhile, each of the above-described large area type complex magnetic field shielding sheets 100 and 200 may be implemented as a wireless power transfer module 1 to charge a battery of an electric automobile.

Figure 11:
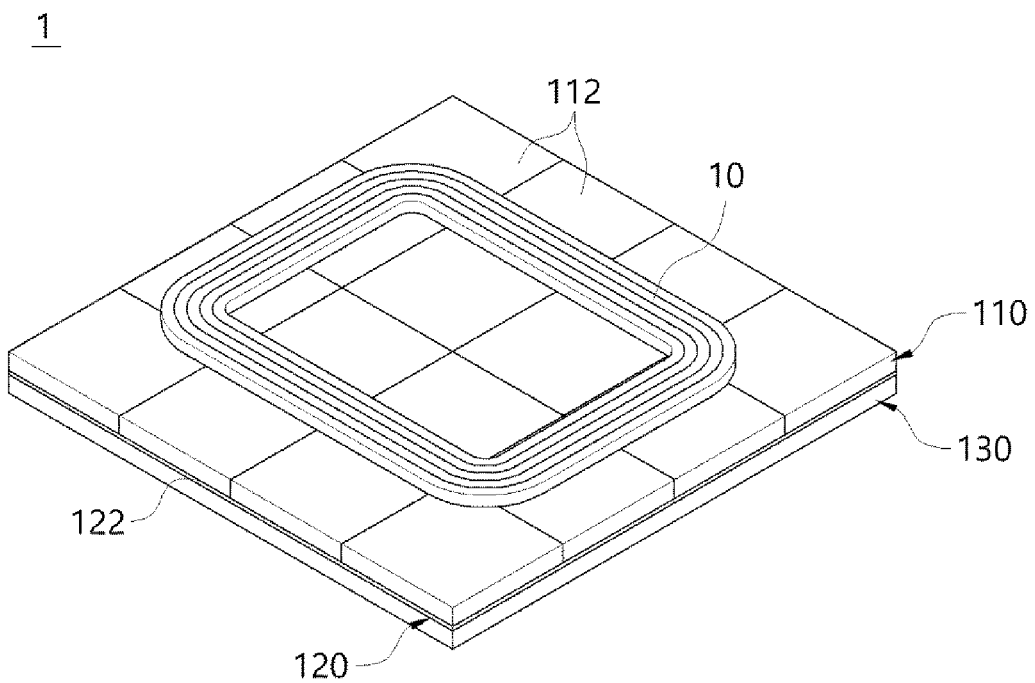
FIG. 11 is a view illustrating a wireless power transfer module to which the large area type complex magnetic field shielding sheet according to one embodiment of the present invention is applied.

As an example, as shown in FIG. 11, the wireless power transfer module 1 may include at least one wireless power transfer antenna 10, which receives or transmits power using a magnetic field of a predetermined frequency band, and a shielding sheet which shields the magnetic field generated from the wireless power transfer antenna 10, and the shielding sheet may be the above-described large area type complex magnetic field shielding sheet 100 or 200.

In this case, the wireless power transfer module 1 may be implemented as a wireless power transmission module in a case in which the wireless power transfer antenna 10 transmits the wireless power to the outside or may be implemented as a wireless power receiving module in a case in which the wireless power transfer antenna 10 receives the wireless power.

Further, an example in which the above-described large area type complex magnetic field shielding sheet 100 or 200 is applied to the wireless power transfer module 1 which charges the battery of the electric automobile is described, but the present invention is not limited thereto, and all large area type complex magnetic field shielding sheets which shield a magnetic field from home appliances, household goods, or the like each having a large area of 100 mm×100 mm or more may be applied without limitation in a product or use.

Although one embodiment of the present invention is described above, the spirit of the present invention is not limited to the embodiment shown in the description, and although those skilled in the art may provide other embodiments through the addition, change, or removal of the components within the scope of the same spirit of the present invention, such embodiments are also included in the scope of the spirit of the present invention.

The invention claimed is:

1. A large area type complex magnetic field shielding sheet of which at least one of an overall width, an overall length, and a diameter is 100 mm or more, comprising:
 a main shielding layer including a plurality of ferrite block bodies disposed with one side of each of the plurality of ferrite block bodies adjacent to each other so as to constitute a major shielding layer configured to shield a magnetic field; and
 an auxiliary shielding layer formed of at least one magnetic sheet having a predetermined area and laminated on one surface of the main shielding layer through an adhesive layer so as to complement the main shielding layer,
 wherein the at least one magnetic sheet has a size or area greater than that of each of the plurality of ferrite block bodies,
 wherein the magnetic field which leaks into a gap between two ferrite block bodies that are disposed adjacent to each other is blocked by the magnetic sheet,
 wherein the auxiliary shielding layer is attached to one surface of the main shielding layer to cover the gap between at least two ferrite block bodies,
 wherein a thickness of the auxiliary shielding layer is half or less of an overall thickness of the main shielding layer, and
 wherein at least a portion of the gap between the two ferrite block bodies disposed to be adjacent each other is not parallel to a thickness direction of the auxiliary shielding layer.

2. The large area type complex magnetic field shielding sheet of claim 1, wherein:
 the magnetic sheet is an amorphous ribbon sheet; and
 the ferrite block bodies are formed of a Mn—Zn ferrite.

3. The large area type complex magnetic field shielding sheet of claim 1, wherein the plurality of ferrite block bodies are arranged in an m×n matrix structure in one surface of the auxiliary shielding layer, wherein m and n are natural numbers.

4. The large area type complex magnetic field shielding sheet of claim 1, wherein the auxiliary shielding layer is provided as a pair to be disposed on each of an upper surface and a lower surface of the main shielding layer.

5. The large area type complex magnetic field shielding sheet of claim 1, wherein:
 the auxiliary shielding layer and the main shielding layer are each provided in plural; and
 the plurality of auxiliary shielding layers and the plurality of main shielding layers are alternately laminated in a lamination direction.

6. The large area type complex magnetic field shielding sheet of claim 1, wherein:
 the auxiliary shielding layer and the main shielding layer are each provided in plural; and
 each of the plurality of main shielding layers is disposed to be located between two auxiliary shielding layers.

7. The large area type complex magnetic field shielding sheet of claim 1, further comprising a plate-shaped heat dissipation plate disposed on one surface of the auxiliary shielding layer.

8. The large area type complex magnetic field shielding sheet of claim 7, wherein the heat dissipation plate is formed of a metallic material.

9. The large area type complex magnetic field shielding sheet of claim 7, wherein the heat dissipation plate is formed of heat dissipation plastic.

10. The large area type complex magnetic field shielding sheet of claim 1, wherein the magnetic sheet is flaked and separated into a plurality of pieces,
 wherein each of the plurality of pieces is smaller than the magnetic sheet.

11. A wireless power transfer module comprising:
 a large area type complex magnetic field shielding sheet of which at least one of an overall width, an overall length, and a diameter is 100 mm or more; and
 at least one wireless power transfer antenna disposed on one surface of the large area type complex magnetic field shielding sheet,
 wherein the large area type complex magnetic field shielding sheet comprises:
 a main shielding layer including a plurality of ferrite block bodies disposed with one side of each of the plurality of ferrite block bodies adjacent to each other so as to constitute a major shielding layer configured to shield a magnetic field; and
 an auxiliary shielding layer formed of at least one magnetic sheet having a predetermined area and laminated on one surface of the main shielding layer through an adhesive layer so as to complement the main shielding layer,
 wherein the at least one magnetic sheet has a size or area greater than that of each of the plurality of ferrite block bodies,
 wherein the magnetic field which leaks into a gap between two ferrite block bodies that are disposed adjacent to each other is blocked by the magnetic sheet,
 wherein the auxiliary shielding layer is attached to one surface of the main shielding layer to cover the gap between at least two ferrite block bodies,
 wherein a thickness of the auxiliary shielding layer is half or less of an overall thickness of the main shielding layer, and
 wherein at least a portion of the gap between the two ferrite block bodies disposed to be adjacent each other is not parallel to a thickness direction of the auxiliary shielding layer.

12. The wireless power transfer module of claim 11, wherein:
 the magnetic sheet is an amorphous ribbon sheet; and
 the ferrite block bodies are formed of a Mn—Zn ferrite.

13. The wireless power transfer module of claim 11, wherein the plurality of ferrite block bodies are arranged in an m×n matrix structure in one surface of the auxiliary shielding layer, wherein m and n are natural numbers.

14. The wireless power transfer module of claim 11, wherein the auxiliary shielding layer is provided as a pair to be disposed on each of an upper surface and a lower surface of the main shielding layer.

15. The wireless power transfer module of claim 11, wherein:
 the auxiliary shielding layer and the main shielding layer are each provided in plural; and
 the plurality of auxiliary shielding layers and the plurality of main shielding layers are alternately laminated in a lamination direction.

16. The wireless power transfer module of claim 11, wherein:
 the auxiliary shielding layer and the main shielding layer are each provided in plural; and each of the plurality of main shielding layers is disposed to be located between two auxiliary shielding layers.

17. The wireless power transfer module of claim 11, further comprising a plate-shaped heat dissipation plate disposed on one surface of the auxiliary shielding layer.

* * * * *